United States Patent Office 3,714,386
Patented Jan. 30, 1973

3,714,386
DIFFERENTIAL PRESSURE SWITCH USING ELONGATED TUBE AND SPACED INTERIOR WIRE
Frederick A. Gross, Upland, Calif., assignor to International Rectifier Corporation, Los Angeles, Calif.
Filed July 30, 1971, Ser. No. 167,681
Int. Cl. H01h 35/34
U.S. Cl. 200—81 R
4 Claims

ABSTRACT OF THE DISCLOSURE

A taut conductive wire extends through the center of an elongated tube and is normally spaced from the inner walls of the tube. Central portions of the tube are connected to a diaphragm movable in response to variations in differential pressure and contact the taut wire after a predetermined movement. A plurality of elongated tubes and respective centrally located taut wires are also operated from the same source of motion.

BRIEF SUMMARY OF INVENTION

This invention relates to an electrical contact arrangement, and more particularly relates to an electrical contact arrangement which may be operated by mechanical motion due to varying differential pressures.

Arrangements wherein a pair of contacts are to be operated in response to the measurement of a pressure are well known. In almost all cases, these contacts are immersed in the fluid whose pressure is being measured, or, in the case of measured differential pressure, are immersed in one of the fluids developing the differential pressure.

In accordance with the present invention, a novel contact arrangement is provided wherein a taut wire serves as one of a pair of electrical contacts and extends through a hollow elongated tube which serves as the second of the pair of cooperating contacts. The wire is normally spaced from the interior of the tube, and a given deflection of the outer tube causes engagement between the wire and the interior of the tube, thereby permitting the operation of an electrical circuit which monitors whether or not these members are engaged. An important advantage of this arrangement is that the electrical contact takes place in an area which may be isolated from the fluid medium which produces mechanical motion being monitored. Thus, the device of the present invention can be advantageously used in connection with the measurement of pressure of highly corrosive or explosive fluids.

The novel structure of the invention has general use in applications where high sensitivity to differential pressure over a wide range of pressures is required. This high sensitivity is obtained in part since the arrangement avoids the inherent hysteresis of mechanical seals or the requirement of placing the electrical contacts within the fluid generating one of the pressures in the pressure system.

BRIEF DESCRIPTION OF THE DRAWINGS

FIG. 1 schematically illustrates the principle of the present invention.

FIG. 2 schematically illustrates, in cross-section, a typical device employing the concept of the invention for the measurement of differential pressure.

FIG. 3 is a schematic cross-sectional drawing illustrating the manner in which a plurality of contacts can be used with a common pressure barrier.

FIG. 4 is a top plan view of a preferred embodiment of the invention.

FIG. 5 is a cross sectional view of FIG. 4 taken across the section line 5—5 in FIG. 4.

FIG. 6 is a side view partly in plan and partly in section of a further embodiment of the present invention and is a partial cross-sectional view taken across the section line 6—6 in FIG. 7.

FIG. 7 is a cross-sectional view of FIG. 6 taken across the section line 7—7 in FIG. 6.

FIG. 8 is an enlarged view of the detail shown in the circle labeled Detail A in FIG. 7.

FIG. 9 is an enlarged view of the detail shown in the circle labeled Detail B in FIG. 7.

DETAILED DESCRIPTION OF THE PREFERRED EMBODIMENTS

Referring first to FIG. 1, there is illustrated a contact arrangement of the type contemplated by the invention and consists of a central taut wire 10 which is fixed at its ends in some suitable manner (not shown) to hold the wire taut. A hollow elongated conductive tube 11 surrounds wire 10, and is fixed in position as by being supported at its ends. When the tube 11 is in an undistorted condition, it is spaced from and electrically insulated from the centrally disposed wire 10. An electrical monitoring circuit including a suitable voltage source 12 and indicating lamp 13 are then connected between wire 10 and tube 11 so that the indicator 13 will be activated if the wire 10 should touch the interior of tube 11 because of a deflection of tube 11.

Tube 11 is then connected at its central regions to a suitable operating member 14, which is driven from flexible diaphragm 15. The diaphragm 15 is exposed to two pressures $P_1$ and $P_2$ on its opposite sides so that the diaphragm 15 moves either to the right or to the left depending upon the pressure differential between $P_1$ and $P_2$.

In the arrangement of FIG. 1, it will be apparent that when the difference between pressures $P_1$ and $P_2$ is sufficiently great, the central portion of tube 11 will deflect to the right or to the left (depending upon the sense of the difference in pressures between $P_1$ and $P_2$) until contact is made between the interior wall of tube 11 and wire 10.

The arrangement of FIG. 1 is further illustrated in FIG. 2 where like numerals in FIGS. 1 and 2 identify similar components. FIG. 2 further illustrates a housing 20 for housing the tube 11, diaphragm 15, and connecting link 14, where the housing 20 contains suitable brackets 21 and 22 which are connected to the ends of wire 10. Brackets 21 and 22 are electrically insulated from housing 20 as by insulation pads 23 and 24, respectively. Housing 20 further contains openings 25 and 26 which can receive pressure lines carrying pressures $P_1$ and $P_2$, respectively.

In FIG. 2 electrical contact has been made between the interior of tube 11 and the taut wire 10 at the region 27 because of the deflection of tube 11 from a straight condition. It should be particularly noted that this region of connection is physically isolated from the pressures $P_1$ and $P_2$ which are connected to the opposite sides of diaphragm 15. Thus, the fluids creating the pressures $P_1$ and $P_2$ may be fluids which would create a hazard if exposed to the electrical arcing which might occur at the region of contact between wire 10 and tube 11.

While FIG. 2 illustrates the coupling of only a single pair of contacts to the pressure operating member, it will be apparent that a plurality of such contacts could be operated from a common operating member. By way of example, FIG. 3 schematically illustrates two contact assemblages 30 and 31 which each consist of outer tubes 32 and 33, respectively, and inner taut wires 34 and 35, respectively, which are normally spaced from the interior walls of tubes 32 and 33, respectively. Each of members 30 and 31 are carried in a housing 40 which has a central pressure movable wall 41 therein to divide container 40 into the two pressure regions 43 and 44, respectively.

An operating linkage consisting of link halves 45 and 46 is then connected to the movable wall 41, as illustrated, where each of linkages 45 and 46 are connected to tubes 32 and 33, respectively, through the lost-motion slots 47 and 48, respectively. A pressure $P_1$ is connected to chamber 43 while a pressure $P_2$ is connected to chamber 44. It will be understood that the lateral position of the center of wall 41 will then be related to the difference between these pressures. Thus, when the pressure $P_1$ exceeds the pressure $P_2$ by some given amount, wall 41 will move to the left and the end of slot 47 will engage tube 32 and deflect the center of tube 32 to the left. Tube 32 ultimately will contact wire 34, thereby to indicate the presence of a given pressure differential between pressures $P_1$ and $P_2$. A similar action will occur when the pressure $P_1$ exceeds the pressure $P_2$ by a given amount, whereupon the center of tube 31 will be deflected to the right until taut wire 35 is engaged.

FIGS. 4 and 5 illustrate a preferred embodiment of the invention which uses the concepts particularly disclosed in FIGS. 1 and 2. Referring to FIG. 5, there is illustrated a casing 50 having a threaded nut 51 which threadably receives a cap 52. A flexible barrier 53 extends across the end of casing 50 and a pressure seal is formed by the sealing ring 54 captured between the external rim of flexible wall 53 and the cap 52 to define a sealed pressure region 55.

A second sealed pressure region 56 may be formed to the left of barrier 53 which could include a second sealing ring (not shown) between the rim of barrier 53 and the end of container 50. Suitable pressure connections 57 and 58 are formed to permit connection of suitable pressure tubing to volumes 55 and 56, respectively. An elongated conductive tube 60 is then welded or brazed in place within aligned openings on the opposite sides of container 50, as illustrated. Two brackets 61 and 62 are then provided which are bolted to opposite surface portions of container 50 as by bolts 63 and 64 which pass through openings in brackets 61 and 62, respectively, and through the elongated slots 65 and 66, respectively, in the container 50.

Suitable lock washers 67 and 68 and nuts 69 and 70 are then provided to secure bolts 63 and 64 and thus brackets 61 and 62 in position. Note that sealing rings (not shown) can also be incorporated in the arrangement bolting brackets 61 and 62 in place in order to insure isolation between the volume 56 and the volume external of container 50. The outer ends of each of brackets 61 and 62 contain openings 71 and 72, respectively, through which the opposite ends of taut wire 73 are passed. The ends of taut wire 73 further pass through insulation spacers 74 and 75 and are secured to externally threaded bolt sections 76 and 77, respectively, as by welding or brazing, or the like. Nuts 78 and 79 are then tightened over bolt sections 76 and 77 to secure the ends of wire 73 in position. It is to be noted that the wire can be accurately located with respect to the axis of tube 60 by slightly loosening either of nuts 78 or 79 and then adjusting the position of the ends of wire 73. For greater ranges of adjustment, bolts 63 and 64 can be loosened and the entire position of brackets 61 and 62 can be changed within the range of motion permitted by slots 65 and 66. The central region of movable pressure wall 53 is then suitably connected as by a link 80 to the center of tube 60. Note that this link may be brazed to the exterior of tube 60.

In a typical embodiment of the invention, tube 60 can be a stainless steel tube having an outer diameter of .032 inch with a wall thickness of .00625 inch. The length of this tube may be any desired length, typically 3 inches. The tube 60 preferably has a free-state straightness within 0.002 inch. Such tubes are conventionally available and are used for the manufacture of hypodermic needles. The wire 73 is a wire which may be of any desired material having an outer diameter preferably less than .005 inch, although other thickness wires could be used so long as there is some free-state clearance between the outer diameter of the taut wire 73 and the interior of tube 60. This will also depend upon the type of mechanical loading applied to tube 60 and the range of pressure indication which is desired for the indicating device.

To complete the device of FIGS. 4 and 5, a pair of terminals, schematically illustrated as terminals 90 and 91, may be connected to bracket 61 and wire 73, respectively. Note that the wire 73 is electrically insulated from the other components of the assemblage by the insulation washers 74 and 75. The device of FIGS. 4 and 5 operates as previously described in connection with FIGS. 1, 2 and 3. Thus, suitable pressures are applied at pressure connections 57 and 58 and the center of tube 60 is deflected in accordance with the difference between these pressures. When sufficient deflection is obtained, an electrical connection is made between terminals 90 and 91 so that some output signal can be developed to indicate this condition. It will be observed that the pressures applied to chambers 55 and 56 are isolated from the region at which contact occurs between tube 60 and wire 73. Thus, the electrical properties of the fluids within chambers 55 and 56 are of no importance.

By using a tube 60 which has a relatively great length as compared to its diameter, it will be seen that the metal tube defines a low friction elastic member for the contact arrangement which will have long life. Moreover, if it is desirable to the electrical operating circuit, the tube 60 can be electrically insulated from the container 50 with a suitable electrical connection being made from terminal 90 to the tube 60.

Whereas FIGS. 4 and 5 illustrate the pressure responsive element as the flexible member 53, it should be understood that any type of pressure responsive actuating mechanism could be used including such devices as pistons, Bourdons, other tube walls, and the like. Moreover, the mechanical design of the system may include the spring properties of capillary 60 to control the lateral spring rate of the system. Moreover, if desired, mechanical stops (not shown) can be provided to prevent excessive movement of the center of tube 60 which might exceed its elastic properties. Furthermore, the interior of tube 60 which is illustrated in FIG. 5 as exposed to external atmosphere could be sealed and contained in any desired atmosphere.

While the above-noted figures show the connection of tube 60 at its central regions, it will be understood that this connection can be made at other longitudinal portions of the tube, thereby to control the mechanical characteristics of the system. Moreover, it is possible to have the tube 60 supported only at one end thereof so that it is moved with cantilever action by the operating mechanism. In such an embodiment, the outer free end of the tube may be sealed against the atmosphere of the chamber in which it is mounted.

A still further embodiment of the invention is shown in FIGS. 6 to 9. Referring first to FIGS. 6 and 7, it will be seen that the device consists of two identical metallic housing sections 100 and 101 which each contain through-openings, such as through-openings 102 to 105, shown in section 101 of FIG. 7. Suitable clamping bolts, such as bolts 106 and 107, shown in FIG. 6, which are terminated by suitable nuts 108 and 109, respectively, pass through each of the aligned openings in housing sections 100 and 101 to hold these sections together. Each of housing sections 100 and 101 further contain elongated openings 110 and 111 which ultimately receive a cartridge subassembly containing the elongated tube and taut conductive wire, with openings 110 and 111 containing further openings 112 and 113 which extend to their side surfaces as seen in FIG. 6. Openings 112 and 113 further extend into enlarged diameter chambers 114 and 115, respectively.

Pressure conducting channels 116 and 117 each communicate with further channels 118 and 119, respectively (FIG. 6), which are formed in housing sections 100 and 101, respectively, and serve to lead the pressure of pressure connectors connected to hydraulic ports 120 and 121, respectively, to the chambers 114 and 115, respectively.

The two housings are assembled together, as shown in FIG. 6, with the openings 114 and 115 disposed adjacent one another. The adjacent side surfaces of housing sections 100 and 101 receive between them a thin, flexible, continuous diaphragm 130 which is sealed about an outer peripheral region thereof by opposing circular O-rings 131 and 132 which extend around the adjacent surfaces of housing sections 100 and 101, respectively. Saddle plugs 133 and 134, having extending pin sections 135 and 136, respectively, are disposed in openings 114 and 115 and are secured to the opposite surfaces of diaphragm 130. Their projecting pins 135 and 136, respectively, extend through channels 112 and 113, respectively, and enter the channels 110 and 111, respectively, where these extending pins will serve to deflect elongated tubes received in these channels.

The assembly of the taut conductive wire and the hollow tube surrounding the wire, which is received by each of openings 110 and 111, are each formed of cartridge plugs 140 and 141 which are joined together by tube 142. These components are subassembled exteriorly of housing sections 100 and 101, with capillary tube 143 being silver-soldered at its ends to the cartridge tubes 140 and 141, as best shown in FIG. 9 which illustrates the right-hand end of capillary tube 143 as soldered to cartridge 141 by the silver-solder mass 144.

A thin conductive wire 145 is then threaded through the capillary tube 143 and is spaced from the interior walls of the capillary 143, as is best shown in FIGS. 7, 8 and 9. The ends of the wire 145 extend beyond the ends of the capillary 143 and pass through small openings in tension spring boards 150 and 151 which are of insulation material, and which support the terminal structure for the wire 145. Thus, boards 150 and 151 are suitably fixed to section 101 by appropriate plate spacers 152 and 153, while a similar arrangement is provided for supporting the conductive wire of the tube in opening 101 of section 100, shown in FIG. 6 as including plate 160. Note that plate 160 is substantially identical to the plate 150 of FIG. 7 except that plate 160 is used for the section 100, whereas plate 150 is used for the section 101.

Components used in connection with plate 150 shall hereinafter receive the same identifying numerals as those used in connection with plate 160 in FIG. 6. Thus, plates 150 and 160 support a tension spring 161 which is suitably soldered or otherwise affixed to the left-hand end of wire 145. The spring 161 may be held in position by a suitable spring clamp 162. Note that the position of spring 161 may be adjusted by loosening clamp 162 in order to center the left-hand end of wire 145 within the capillary 143.

The right-hand end of wire 145 extends through the opening in terminal board 151 and is connected to the electrical terminal post 165 as by soldering, or the like. The wire 145 is appropriately positioned, as by adjusting the position of plate 151, so that wire 145 is centered with respect to the right-hand end of capillary 143.

A ground terminal 166 is further supported on plate 151 and is appropriately connected to the housing section 101 so that the terminal 28 is, in turn, electrically connected to the conductive capillary 143 through the intermediary of the conductive cartridges 140 and 141. Thus, circuit monitoring equipment may be connected between terminals 165 and 166, with signals being generated in response to the connection of wire 145 and capillary 143.

As best shown in FIG. 6, the saddle plugs 135 and 136 have slotted ends which are engageable with the capillaries, such as capillary 143, extending along opening 111 in section 110 and an equivalent capillary 170 extending in opening 110.

In order to monitor the pressure differential between lines connected to ports 120 and 121, it will be seen that when the pressure at port 121 exceeds the pressure of port 120 by a given amount, the diaphragm 130 will deflect to the left, thereby causing connection between the capillary 170 and its central conducting wire. This will then produce an output signal between terminals on the terminal board associated with section 100. Had the pressure differential been in the opposite direction, the diaphragm 130 would move to the right in FIG. 6, thereby to cause connection between wire 145 and capillary 143.

It is to be noted that an electrical indication can be developed from the structure of FIGS. 6 to 9 when a monitored pressure differential is either above or below a given pressure range by appropriate control of the depth of the slots in saddle plugs 133 and 134 which, in turn, controls the wire at which the base of the slots engage the respective capillary tube. It should be further noted that mechanical springs can be coupled to the plugs or to the capillary tubes in order to control the shape of the characteristic controlling the pressure differential at which contact is made between the capillary tube and its central conductive wire.

Although this invention has been described with respect to its preferred embodiments, it should be understood that many variations and modifications will now be obvious to those skilled in the art, and it is preferred, therefore, that the scope of the invention be limited, not by the specific disclosure herein, but only by the appended claims.

I claim:
1. A contact structure and an actuating mechanism therefor; said contact structure comprising:
   an elongated conductive hollow tube;
   an elongated conductive wire disposed within the interior of said tube and being longitudinally coextensive with said tube and being normally insulated from said tube;
   means for mounting said hollow conductive tube in a fixed position;
   means for supporting said elongated wire within said tube and being normally spaced from the interior walls of said tube; the ends of said wire extending beyond the ends of said tube; and an adjustable bracket means for securing said wire relative to said tube;
   said actuating mechanism connected to a portion of said elongated hollow tube and being operable to flex said tube laterally, thereby to cause electrical contact between the interior of said tube and said wire.
2. The structure of claim 1 wherein said actuating mechanism includes means for establishing a pressure differential between first and second volumes and for moving said actuating mechanism in accordance with said pressure differential.
3. The structure of claim 2 wherein the interior of said tube is isolated from both of said first and second volumes.
4. The structure of claim 2 wherein the interior of said tube is isolated from at least one of said first and second volumes.

References Cited

UNITED STATES PATENTS

| | | | |
|---|---|---|---|
| 3,339,049 | 8/1967 | Gover | 200—168 G X |
| 3,160,723 | 12/1964 | Wallace | 200—83 R |
| 3,573,725 | 4/1971 | Shellhause | 200—83 R |
| 3,457,384 | 7/1969 | Topfer et al. | 200—83 N |
| 2,525,743 | 10/1950 | White | 200—83 J |
| 3,488,461 | 1/1970 | Webb | 200—166 BH U X |

FOREIGN PATENTS

| | | | |
|---|---|---|---|
| 656 | 2/1926 | Australia | 200—166 BA |

ROBERT K. SCHAEFER, Primary Examiner
R. A. VANDERHYE, Assistant Examiner

U.S. Cl. X.R.

200—83 R, 83 J, 166 BH, 168 G